United States Patent
Moriya et al.

(10) Patent No.: US 7,870,844 B2
(45) Date of Patent: Jan. 18, 2011

(54) CONTROL SYSTEM AND METHOD FOR INTERNAL COMBUSTION ENGINE

(75) Inventors: Hidenori Moriya, Susono (JP); Ryo Tadokoro, Okegawa (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 203 days.

(21) Appl. No.: 12/226,713

(22) PCT Filed: Apr. 27, 2007

(86) PCT No.: PCT/IB2007/001099
§ 371 (c)(1),
(2), (4) Date: Oct. 24, 2008

(87) PCT Pub. No.: WO2007/125401
PCT Pub. Date: Nov. 8, 2007

(65) Prior Publication Data
US 2009/0078235 A1   Mar. 26, 2009

(30) Foreign Application Priority Data
May 1, 2006   (JP) ............................. 2006-127409

(51) Int. Cl.
*F02B 47/08*   (2006.01)
*F02M 25/07*   (2006.01)

(52) U.S. Cl. ........................... 123/406.45; 123/406.44; 123/568.14

(58) Field of Classification Search ............ 123/406.44, 123/406.45, 568.14
See application file for complete search history.

(56) References Cited

U.S. PATENT DOCUMENTS

| 5,778,857 | A | 7/1998 | Nakamura et al. | |
| 6,994,077 | B2 * | 2/2006 | Kobayashi et al. | 123/568.11 |
| 7,146,964 | B2 * | 12/2006 | Norimoto et al. | 123/435 |
| 7,347,185 | B2 * | 3/2008 | Moriya et al. | 123/435 |
| 7,532,971 | B2 * | 5/2009 | Sasaki et al. | 701/102 |
| 7,594,493 | B2 * | 9/2009 | Matekunas et al. | 123/299 |
| 2002/0019291 | A1 | 2/2002 | Ito | |
| 2005/0092286 | A1 | 5/2005 | Sasaki et al. | |
| 2005/0188955 | A1 * | 9/2005 | Koopmans | 123/435 |
| 2006/0150953 | A1 * | 7/2006 | Moriya et al. | 123/435 |

FOREIGN PATENT DOCUMENTS

DE   10 2004 001 825 A1   9/2004
EP   1 106 805 A1   6/2001

(Continued)

OTHER PUBLICATIONS

Foreign Office Action drafted Aug. 24, 2010, dispatch date: Aug. 31, 2010 in Japanese Application No. 2006-127409 (with translation).

*Primary Examiner*—Erick Solis
(74) *Attorney, Agent, or Firm*—Oliff & Berridge, PLC (57) ABSTRACT

A control system includes: a detecting device that detects the transition in the cumulative amount of heat generated in a combustion chamber based on the pressure in the combustion chamber in an expansion stroke; and a controller that controls the amount of exhaust gas contained in an air-fuel mixture in the combustion chamber such that the amount of change in the cumulative amount of heat generated in the combustion chamber through a predetermined crank angle range will become a predetermined value.

5 Claims, 7 Drawing Sheets

| | FOREIGN PATENT DOCUMENTS | | | | |
|---|---|---|---|---|---|
| EP | 1 394 396 A2 | 3/2004 | JP | A-8-312407 | 11/1996 |
| EP | 1 674 700 A2 | 6/2006 | JP | A-9-250435 | 9/1997 |
| JP | A-56-124673 | 9/1981 | JP | A-2004-225650 | 8/2004 |
| JP | B-62-53710 | 11/1987 | JP | A-2005-36754 | 2/2005 |
| JP | A-4-81557 | 3/1992 | JP | A-2006-144645 | 6/2006 |
| | | | WO | WO 2007/013663 A1 | 2/2007 |

* cited by examiner

CONTROL SYSTEM AND METHOD FOR INTERNAL COMBUSTION ENGINE

BACKGROUND OF THE INVENTION

1. Field of the Invention

The present invention relates to a control system and method for an internal combustion engine.

2. Description of the Related Art

Japanese Patent Application Publication No. JP-A-2004-225650 discloses a device for estimating the amount of exhaust gas in an air-fuel mixture in a combustion chamber of an internal combustion engine. Based on the recognition that the amount of heat generated in the combustion chamber can be estimated based on the pressure in the combustion chamber, the device according to Japanese Patent Application Publication No. JP-A-2004-225650 estimates the amount of exhaust gas in the air-fuel mixture in the combustion chamber based on the amount of heat generated in the combustion chamber.

However, while Japanese Patent Application Publication No. JP-A-2004-225650 is based on the recognition that the amount of heat generated in the combustion chamber correlates with the pressure in the combustion chamber, and that the amount of exhaust gas in the air-fuel mixture in the combustion chamber correlates with the amount of heat generated in the combustion chamber, as described above, it is not based on the recognition that the amount of exhaust gas in the air-fuel mixture in the combustion chamber correlates with the pattern of combustion in the combustion chamber, and hence with the torque obtained from the combustion.

SUMMARY OF THE INVENTION

An object of the present invention is to precisely control the pattern of combustion in a combustion chamber based on the recognition that the amount of exhaust gas in an air-fuel mixture in the combustion chamber correlates with the pattern of combustion in the combustion chamber, and hence with the torque obtained from the combustion.

A first aspect of the present invention provides a control system for an internal combustion engine, including: means for detecting transition in a cumulative amount of heat generated in a combustion chamber based on a pressure in the combustion chamber in an expansion stroke; and means for controlling an amount of exhaust gas contained in an air-fuel mixture in the combustion chamber such that an amount of change in the cumulative amount of heat generated in the combustion chamber through a predetermined crank angle range will become a predetermined value.

A second aspect of the present invention provides the control system for an internal combustion engine according to the first aspect described above, further including: means for controlling an ignition timing of fuel in the combustion chamber according to operating conditions of the internal combustion engine, in which the predetermined value for the amount of change in the cumulative amount of heat generated in the combustion chamber through the predetermined crank angle range is set according to the ignition timing of fuel in the combustion chamber.

A third aspect of the present invention provides the control system for an internal combustion engine according to the second aspect described above, in which the ignition timing of fuel in the combustion chamber is controlled such that the cumulative amount of heat generated in the combustion chamber will become a predetermined value at a predetermined crank angle.

A fourth aspect of the present invention provides the control system for an internal combustion engine according to the second aspect described above, in which the predetermined value for the amount of change in the cumulative amount of heat generated in the combustion chamber through the predetermined crank angle range is set to be smaller, in a case where a combustion rate of fuel is highest when the cumulative amount of heat generated in the combustion chamber follows a locus on which the cumulative amount becomes a predetermined value at a predetermined crank angle, the ignition timing of fuel in the combustion chamber is retarded compared to that at which the cumulative of the amount of heat generated in the combustion chamber can follow the locus on which the cumulative amount becomes the predetermined value at the predetermined crank angle.

A fifth aspect of the present invention provides the control system for an internal combustion engine according to any one of the first to fourth aspects described above, in which an upper limit and a lower limit are set to the predetermined value for the amount of change in the cumulative amount of heat generated in the combustion chamber through the predetermined crank angle range, and the predetermined value for the amount of change is set to a value between the upper limit and the lower limit based on the operating conditions of the internal combustion engine.

A sixth aspect of the present invention provides the control system for an internal combustion engine according to the fifth aspect described above, in which the predetermined value for the amount of change in the cumulative amount of heat generated in the combustion chamber through the predetermined crank angle range is set to a value closer to the upper limit rather than to the lower limit when the operating conditions of the internal combustion engine suggest that priority is given to increasing torque output from the internal combustion engine.

A seventh aspect of the present invention provides the control system for an internal combustion engine according to the fifth or sixth aspect described above, in which the predetermined value for the amount of change in the cumulative amount of heat generated in the combustion chamber through the predetermined crank angle range is set to a value closer to the lower limit rather than to the upper limit when the operating conditions of the internal combustion engine suggest that priority is given to reducing emission of exhaust gas from the combustion chamber.

An eighth aspect of the present invention provides the control system for an internal combustion engine according to any one of the first to seventh aspects described above, in which the amount of exhaust gas contained in the air-fuel mixture in the combustion chamber is controlled to be smaller as the predetermined value for the amount of change in the cumulative amount of heat generated in the combustion chamber through the predetermined crank angle range is set to be smaller.

A ninth aspect of the present invention provides the control system for an internal combustion engine according to any one of the first to eighth aspects described above, in which the predetermined crank angle range is set according to the ignition timing of fuel in the combustion chamber.

A tenth aspect of the present invention provides a control system for an internal combustion engine, including: a plurality of torque control means; and control means. The plurality of torque control means are different from each other and can change torque output from the internal combustion engine. A torque response and a torque sensitivity to the respective torque control means are different from each other. The torque response is a parameter indicating a duration since each torque control means has started an attempt to change the torque until the torque is actually changed. The torque sensitivity is a parameter indicating a maximum level to which the torque can be changed by each torque control means. The control means determines an amount of control to be achieved by each torque control means according to the torque response and the torque sensitivity selected according to operating conditions of the internal combustion engine when torque required of the internal combustion engine is changed.

An eleventh aspect of the present invention provides the control system for an internal combustion engine according to the tenth aspect described above, in which a higher torque response is selected when the operating conditions of the internal combustion engine suggest that priority is given to reducing emission of exhaust gas from a combustion chamber.

A twelfth aspect of the present invention provides the control system for an internal combustion engine according to the tenth aspect described above, in which the torque required of the internal combustion engine is determined based on an amount of displacement of an accelerator pedal, and a higher torque sensitivity is selected when the operating conditions of the internal combustion engine suggest that the amount of displacement of the accelerator pedal or an amount of change therein per unit time is more than a predetermined value.

A thirteenth aspect of the present invention provides the control system for an internal combustion engine according to the tenth aspect described above, in which a higher torque sensitivity is selected when the operating conditions of the internal combustion engine suggest that the torque required of the internal combustion engine is less than a predetermined value.

A fourteenth aspect of the present invention provides a control system for an internal combustion engine, including: control means for controlling a combustion pattern in a combustion chamber to a target combustion pattern in the combustion chamber set according to torque required of the internal combustion engine, by controlling an ignition timing of fuel in the combustion chamber, a progress speed of combustion after ignition, and a cumulative amount in time or average of torque produced by the combustion of fuel.

A fifteenth aspect of the present invention provides the control system for an internal combustion engine according to the fourteenth aspect described above, in which the progress speed of combustion after the ignition is controlled by controlling an amount of exhaust gas contained in an air-fuel mixture in the combustion chamber.

A sixteenth aspect of the present invention provides a control method for an internal combustion engine, including: detecting transition of a cumulative amount of heat generated in a combustion chamber based on a pressure in the combustion chamber in an expansion stroke; and controlling an amount of exhaust gas contained in an air-fuel mixture in the combustion chamber such that an amount of change in the cumulative amount of heat generated in the combustion chamber through a predetermined crank angle range will become a predetermined value.

A seventeenth aspect of the present invention provides a control method for an internal combustion engine including a plurality of torque control means that are different from each other and that can change torque output from the internal combustion engine. A torque response and a torque sensitivity to the respective torque control means are different from each other. The torque response is a parameter indicating a duration since each torque control means has started an attempt to change the torque until the torque is actually changed. The torque sensitivity is a parameter indicating a maximum level to which the torque can be changed by each torque control means. The control method includes: selecting the torque response and the torque sensitivity according to operating conditions of the internal combustion engine when torque required of the internal combustion engine is changed; and determining an amount of control to be achieved by each torque control means according to the selected torque response and torque sensitivity.

An eighteenth aspect of the present invention provides a control method for an internal combustion engine, including: setting a target combustion pattern in a combustion chamber according to torque required of the internal combustion engine; and controlling a combustion pattern in the combustion chamber to the target combustion pattern in the combustion chamber, by controlling an ignition timing of fuel in the combustion chamber, a progress speed of combustion after ignition, and a cumulative amount in time or average of torque produced by the combustion of fuel.

According to the aspects of the present invention, the pattern of combustion in the combustion chamber can be controlled more precisely.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF THE PREFERRED EMBODIMENTS

Figure 1:
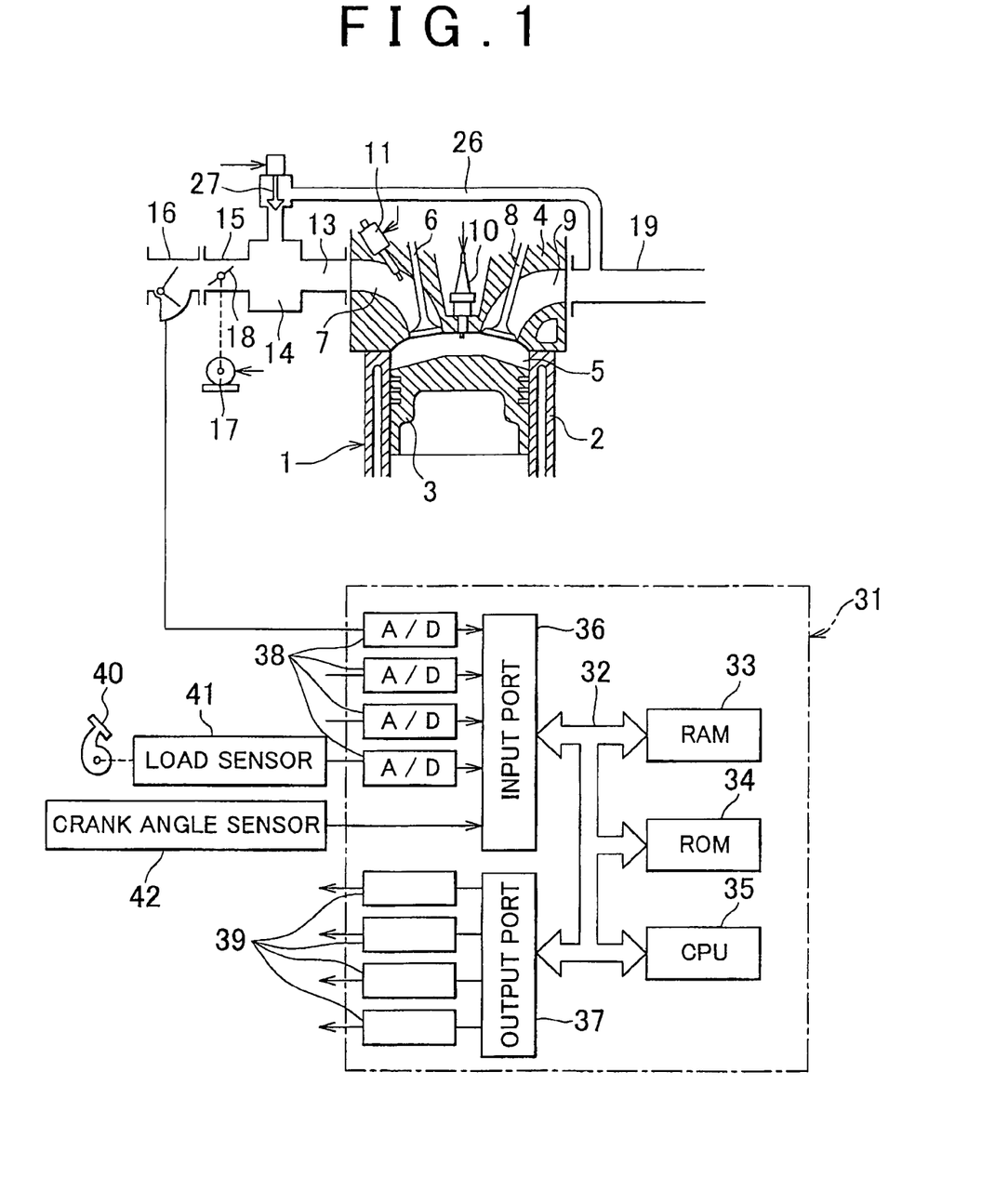
FIG. 1 shows an internal combustion engine to which a control system according to the embodiments of the present invention is applied.

A description will hereinafter be made of the embodiments of the present invention with reference to the drawings. FIG. 1 shows an internal combustion engine to which a control system according to the embodiments of the present invention is applied. The internal combustion engine shown in FIG. 1 is a 4-cylinder spark ignition internal combustion engine. FIG. 1 shows an engine body 1, a cylinder block 2, a piston 3, a cylinder head 4, a combustion chamber 5, an intake valve 6, an intake port 7, an exhaust valve 8, an exhaust port 9, a spark plug 10 and a fuel injection valve 11. The fuel injection valve 11 is mounted to the cylinder head 4 to inject fuel into the intake port 7.

The intake port 7 of each cylinder is connected to a surge tank 14 via a corresponding intake branch pipe 13. The surge tank 14 is connected to an air cleaner (not shown) via an intake duct 15 and an air flow meter 16. A throttle valve 18 driven by a step motor 17 is disposed in the intake duct 15. The exhaust port 9 of each cylinder is connected to a corresponding exhaust branch pipe 19. The exhaust branch pipe 19 and the surge tank 14 are connected to each other via an exhaust gas recirculation (hereinafter referred to as "EGR") conduit 26, in which an EGR control valve 27 is disposed.

An electronic control unit 31 is constituted of a digital computer including a RAM (random access memory) 33, a ROM (read only memory) 34, a CPU (microprocessor) 35, an input port 36 and an output port 37 interconnected via a bi-directional bus 32. The air flow meter 16 produces output voltage proportional to the intake air amount (amount of air inducted into the combustion chamber 5). The output voltage is input to the input port 36 via a corresponding AD converter 38. The load sensor 41 produces output voltage proportional to the amount of displacement of an accelerator pedal 40, that is, the torque required of the internal combustion engine (hereinafter referred to as "required torque"). The output voltage is input to the input port 36 via a corresponding AD converter 38. A crank angle sensor 42 detects the crank angle, and the output therefrom is input to the input port 36.

The intake valve 6 shown in FIG. 1 is connected to a so-called variable intake valve operating mechanism that can linearly change the timing at which the intake valve 6 starts opening (hereinafter referred to as "valve opening timing"), the timing at which the intake valve 6 closes (hereinafter referred to as "valve closing timing"), and the maximum amount of lift to be achieved by the intake valve 6 (hereinafter referred to as "maximum lift amount"). When the variable intake valve operating mechanism changes the valve opening characteristics of the intake valve 6, that is, the valve opening timing, the valve closing timing and the maximum lift amount of the intake valve 6, the amount of air to be inducted into the combustion chamber 5 (hereinafter referred to as "intake air amount") changes. That is, the intake air amount can be controlled by controlling the valve opening characteristics of the intake valve 6 by means of the variable intake valve operating mechanism. As the valve opening timing of the intake valve 6 is advanced by the variable intake valve operating. mechanism to increase overlap between the period for which the exhaust valve 8 is open and the period for which the intake valve 6 is open, or so-called valve overlap, the amount of exhaust gas remaining in the air-fuel mixture in the combustion chamber 5 increases. That is, the amount of exhaust gas remaining in the air-fuel mixture in the combustion chamber 5 can be controlled by controlling the valve opening timing of the intake valve 6 by means of the variable intake valve operating mechanism.

A conventional control scheme for adjusting the torque output from the internal combustion engine (hereinafter referred to as "output torque") to the required torque utilizes the relation that the amount of displacement of the accelerator pedal 40 represents the required torque, as follows. When the required torque is large, an accordingly large amount of air is inducted and a corresponding amount of fuel is injected from the fuel injection valve 11. On the other hand, when the required torque is small, an accordingly small amount of air is inducted and a corresponding amount of fuel is injected from the fuel injection valve 11. It is true that the output torque can be adjusted to the required torque by controlling the intake air amount and the amount of fuel injected from the fuel injection valve 11 (hereinafter referred to as "fuel injection amount"), that is, the amount of heat generated in the combustion chamber 5, according to the required torque. However, the present inventors have found that the output torque changes according to the pattern of progress of combustion in the combustion chamber 5, and that the output torque can be more accurately or more quickly adjusted to the required torque by controlling the pattern of progress of the combustion as well, rather than by controlling the amount of heat generated in the combustion chamber 5 alone. Now, this control will be described with reference to FIGS. 2 and 3.

Figure 2:
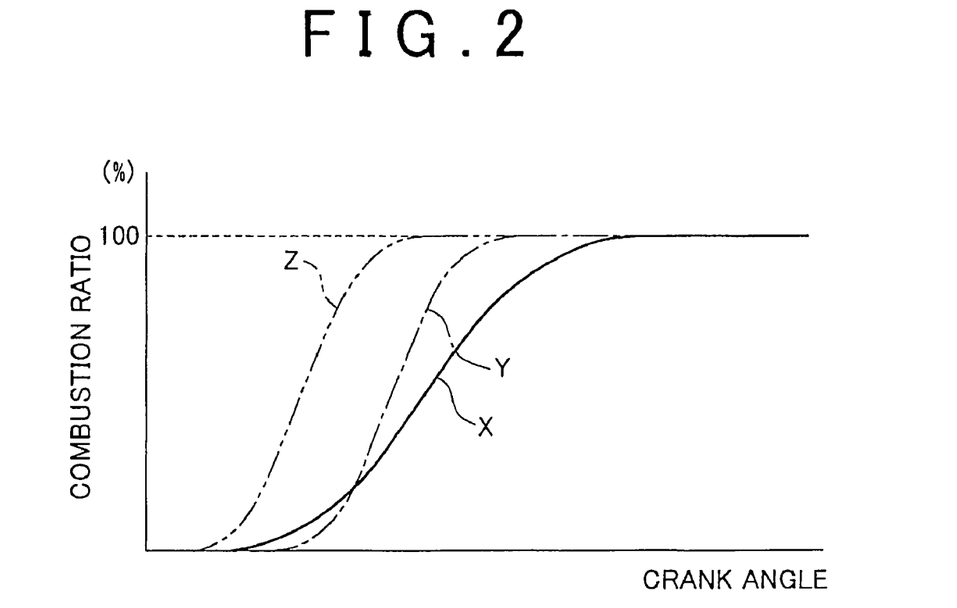
FIG. 2 shows the relation between the crank angle and the combustion ratio.
Figure 3:
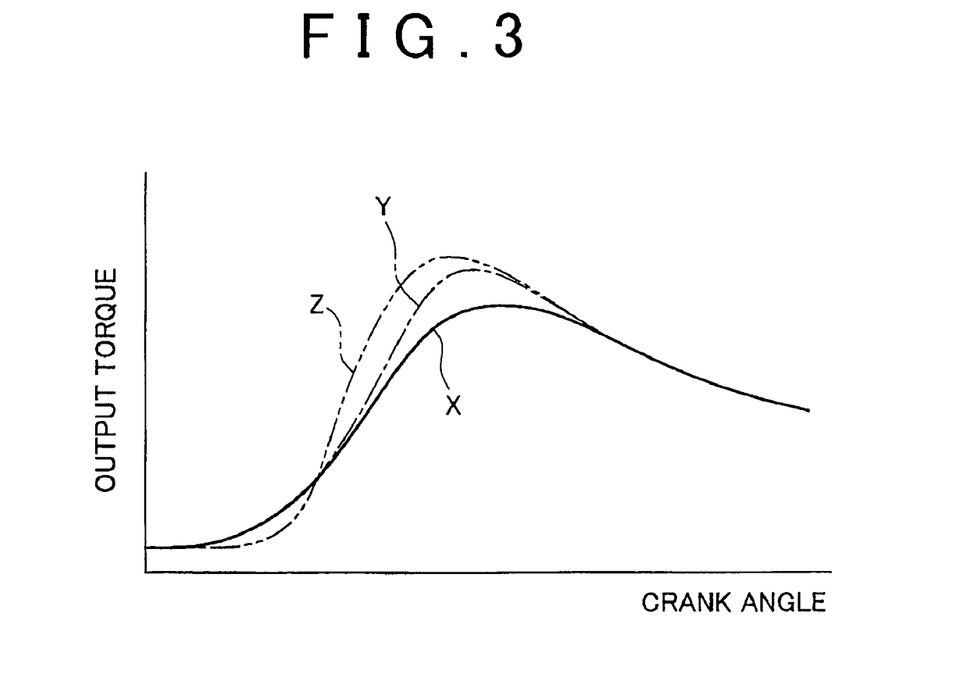
FIG. 3 shows the relation between the crank angle and the output torque.

In FIG. 2, the horizontal axis represents the crank angle and the vertical axis represents the combustion ratio (which represents the ratio of fuel combusted by the time the corresponding crank angle has been reached to the total fuel inducted into the combustion chamber 5, which corresponds to the cumulative amount of heat generated in the combustion chamber 5 by the time the corresponding crank angle has been reached, and which is estimated from, for example, the pressure in the combustion chamber 5). In the case where the pattern of combustion follows the solid line X shown in FIG. 2, the output torque curve follows the solid line X shown in FIG. 3. In the case where the pattern of combustion follows the dot and dash line Y shown in FIG. 2, the output torque curve follows the dot and dash line Y shown in FIG. 3. In the case where the pattern of combustion follows the chain double-dashed line Z shown in FIG. 2, the output torque curve follows the chain double-dashed line Z shown in FIG. 3.

Comparing the combustion in the pattern indicated by the solid line X (hereinafter referred to as "pattern X") in FIG. 2 and the combustion in the pattern indicated by the dot and dash line Y (hereinafter referred to as "pattern Y") in FIG. 2, these two patterns of combustion start at the same timing. After the combustion has started, the combustion ratio increases at a faster speed in the pattern Y than in the pattern X. Thus, the combustion ratio reaches 100% at an earlier timing in the pattern Y than in the pattern X. Meanwhile, the output torque curve indicated by the dot and dash line Y in FIG. 3, which corresponds to the combustion in the pattern Y, has a higher peak than that of the output torque curve indicated by the solid line X in FIG. 3, which corresponds to the combustion in the pattern X. Thus, it can be understood that the output torque by the combustion in the pattern Y is higher than that by the combustion in the pattern X.

Likewise, comparing the combustion in the pattern Y and the combustion in the pattern indicated by the chain double-dashed line Z (hereinafter referred to as "pattern Z") in FIG. 2, these two patterns of combustion increase at the same speed after the combustion has started. The combustion starts at an earlier timing in the pattern Z than in the pattern Y. Thus, the combustion ratio reaches 100% at an earlier timing in the pattern Z than in the pattern Y. Meanwhile, the output torque curve indicated by the chain double-dashed line Z in FIG. 3, which corresponds to the combustion in the pattern Z, has a higher peak than that of the output torque curve indicated by the dot and dash line Y in FIG. 3, which corresponds to the combustion in the pattern Y. Thus, it can be understood that the output torque by the combustion in the pattern Z is higher than that by the combustion in the pattern Y.

As described above, the output torque is varied according to the timing at which the combustion starts (hereinafter referred to as "combustion start timing"), the speed at which the combustion ratio increases (hereinafter referred to as "combustion ratio increase speed") after the combustion has started, that is, the combustion speed (which corresponds to the speed at which the combustion progresses after the fuel has been ignited), and the maximum amount of heat generated (hereinafter referred to as "torque peak value"). That is, the output torque should be more accurately or more quickly adjusted to the required torque by controlling the combustion start timing, the combustion speed and the torque peak value. The present invention is made with a focus on this assumption, that the output torque can be adjusted to the required torque by controlling the combustion start timing, the combustion speed and the torque peak value.

The combustion start timing can be controlled by controlling the timing at which the spark plug 10 fires the fuel (hereinafter referred to as "firing timing"). The combustion speed can be controlled by controlling the amount of exhaust gas contained in the air-fuel mixture in the combustion chamber 5. The torque peak value can be controlled by controlling the intake air amount and the fuel injection amount, that is the amount of the air-fuel mixture in the combustion chamber 5. Based on the above, in the first embodiment of the present invention, the output torque is adjusted to the required torque by controlling the firing timing according to the combustion start timing as a target, the amount of exhaust gas contained in the air-fuel mixture in the combustion chamber 5 according to the combustion speed as a target, and the amount of the air-fuel mixture in the combustion chamber 5 according to the torque peak value as a target. Now, such control will be described with reference to FIG. 4.

Figure 4:
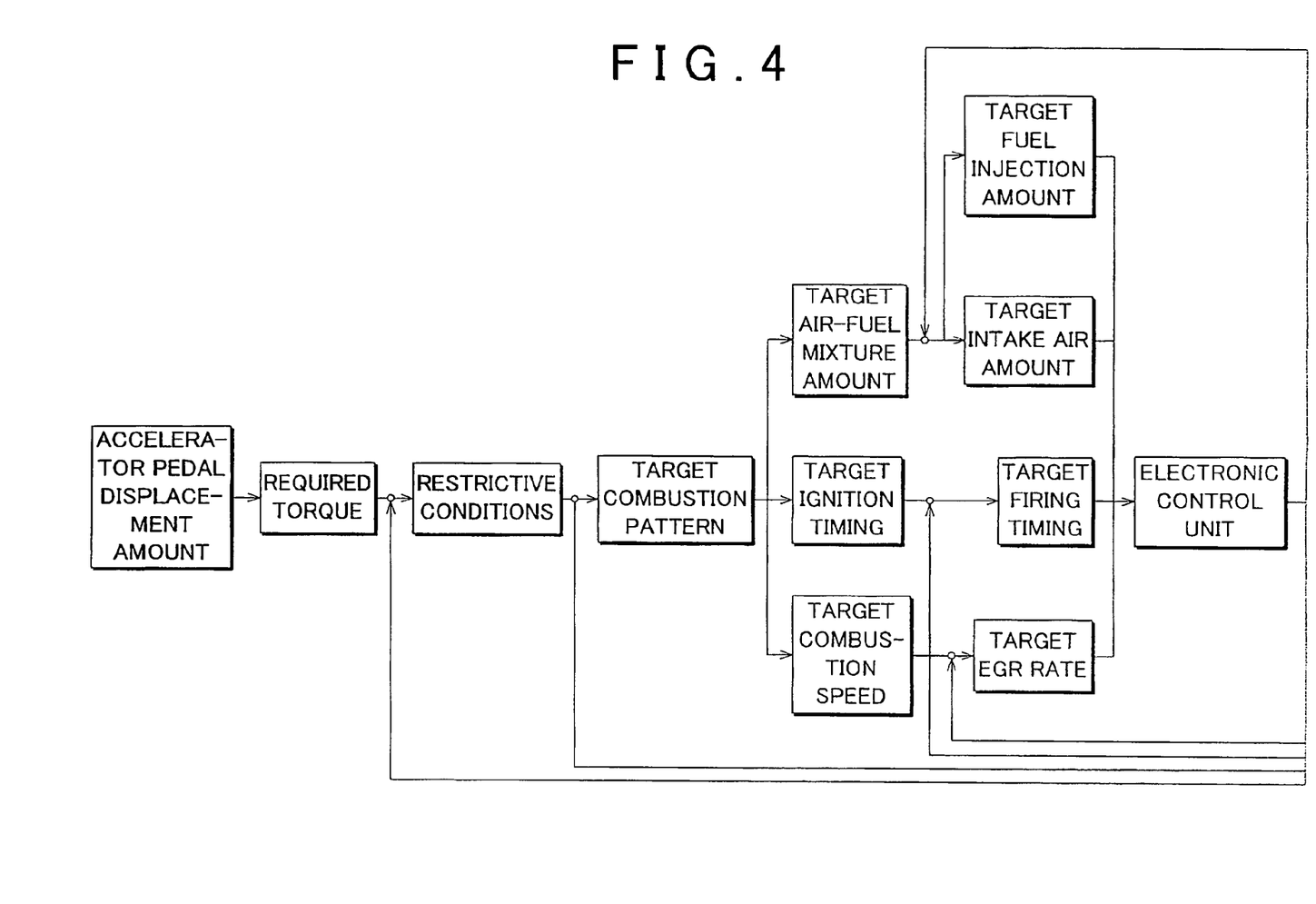
FIG. 4 is a diagram illustrating control of an internal combustion engine in a first embodiment of the present invention.

As shown in FIG. 4, first of all, based on the displacement of the accelerator pedal 40, specifically the amount and speed at which the accelerator pedal 40 is depressed, the output torque as a target (required torque) is determined. Then, considering restrictive conditions such as for avoiding the occurrence of knocking, reducing the exhaust emission to the level required by the regulations, and minimizing the pumping loss, the combustion pattern that should be set as a target (hereinafter referred to as "target combustion pattern") in order to achieve the required torque is determined. Then, the amount of air-fuel mixture in the combustion chamber 5 that should be set as a target (which corresponds to the peak torque value as a target, and which is hereinafter referred to as "target air-fuel mixture amount"), the ignition timing that should be set as a target (which corresponds to the combustion start timing as a target, and which is hereinafter referred to as "target ignition timing"), and the combustion speed as a target (hereinafter referred to as "target combustion speed"), in order to achieve the target combustion pattern, are determined.

Then, the intake air amount as a target (hereinafter referred to as "target intake air amount") and the fuel injection amount as a target (hereinafter referred to as "target fuel injection amount") are determined based on the target air-fuel mixture amount. Also, the firing timing as a target (hereinafter referred to as "target firing timing") is determined based on the target ignition timing. In addition, the EGR rate (which corresponds to the amount of exhaust gas contained in the air-fuel mixture in the combustion chamber 5, and which is the ratio of the amount of exhaust gas to that of the air inducted into the combustion chamber 5, and which is hereinafter referred to as "target EGR rate") is determined based on the target combustion speed.

Then, the thus determined target intake air amount, target fuel injection amount, target firing timing and target EGR rate are sent to the electronic control unit of the internal combustion engine. At least one of the throttle valve 18 and the variable intake valve operating mechanism is controlled such that an amount of air indicated by the determined target intake air amount will be inducted into the combustion chamber 5. The fuel injection valve 11 is controlled so as to inject an amount of fuel indicated by the determined target fuel injection amount. The spark plug 10 is controlled so as to fire the fuel at the determined target firing timing. At least one of the EGR control valve 27 and the variable intake valve operating mechanism is controlled such that the determined target EGR rate will be achieved.

In the first embodiment of the present invention, the fuel injection valve 11, at least one of the throttle valve 18 and the variable intake valve operating mechanism, the spark plug 10, and at least one of the EGR control valve 27 and the variable intake valve operating mechanism are controlled, as described above. The actual torque peak value, combustion start timing, combustion speed and output torque are monitored. The target air-fuel mixture amount is feedback-corrected based on the difference between the actual torque peak value and the torque peak value expected from the target air-fuel mixture amount, such that the actual torque peak value will become the target torque peak value. The target ignition timing is feedback-corrected based on the difference between the actual combustion start timing and the combustion start timing estimated from the target ignition timing, such that the actual combustion start timing will become the target combustion start timing. The target combustion speed is feedback-corrected based on the difference between the actual combustion speed and the target combustion speed, such that the actual combustion speed will become the target combustion speed. The target torque is feedback-corrected based on the difference between the actual output torque and the target torque, such that the actual output torque will become the target torque.

By performing such feedback correction, the combustion pattern can be more accurately controlled to the target combustion pattern, thus resulting in appropriate control of the torque to be produced.

In the first embodiment of the present invention, the occurrence of knocking, the in-cylinder temperature (an element that could affect the exhaust emission) and the pumping loss are also monitored to be fed back for and considered in the determination of the target combustion pattern.

Figure 5:
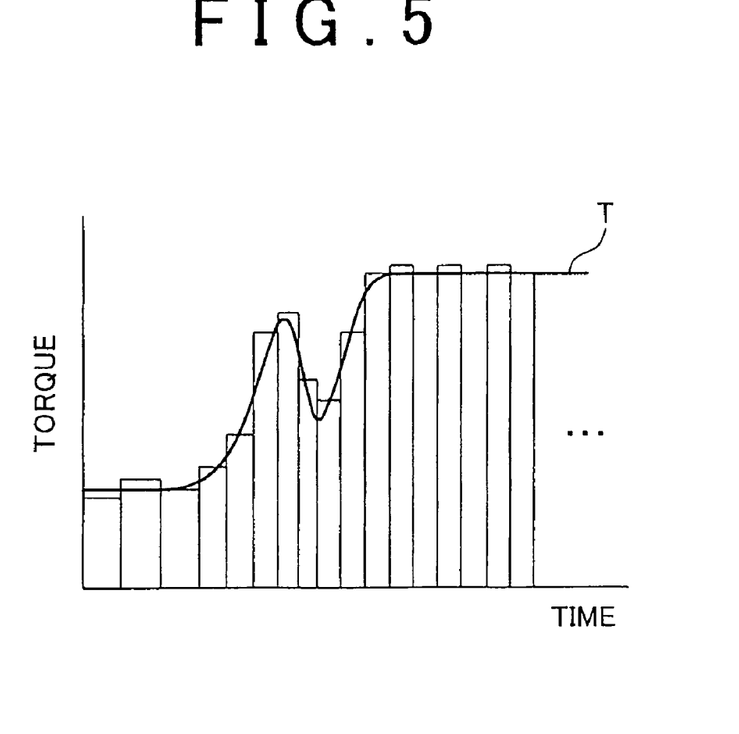
FIG. 5 shows the relation between the locus of required torque and the torque output from each cylinder.

In the first embodiment of the present invention, combustions are performed sequentially in the respective cylinders. The target combustion pattern for each cylinder is determined such that the locus of the torque output by the combustions in the respective cylinders follows the locus of the required torque determined by the displacement of the accelerator pedal 40. That is, as shown in FIG. 5, as the required torque follows the locus T along with the lapse of time, the target combustion pattern for each cylinder is determined such that the torque output from the respective cylinders (in FIG. 5, each vertical bar corresponds to the torque output from each cylinder) follows the locus T. Then, based on the thus determined target combustion pattern, the target air-fuel mixture amount, the target ignition timing and the target combustion speed for each cylinder are determined.

By determining the target air-fuel mixture amount, the target ignition timing and the target combustion speed for each cylinder as described above, it is possible to significantly reduce the number of man-hours required of the developer in the design stage, compared to the case of conventional sequence control.

Knocking or torque shock may possibly occur when the torque peak value in the combustion in each cylinder is a predetermined value or more, or when the difference in torque output from cylinders where combustions occur consecutively (or so-called torque fluctuations) is a predetermined value or more. When the torque peak value in the combustion in each cylinder is a predetermined value or more, or when the difference in torque output from cylinders where combustions occur consecutively is a predetermined value or more, the target ignition timing may be corrected so as to be retarded.

In the case where the target combustion pattern is determined for each cylinder such that the locus of the output torque will follow that of the required torque, and where the target air-fuel mixture amount, the target ignition timing and the target combustion speed are controlled for each cylinder such that the combustion pattern will become the target combustion pattern, as described above, the target air-fuel mixture amount, the target ignition timing and the target combustion speed for each cylinder may be corrected as described below.

When the target combustion pattern is determined for each cylinder such that the locus of the output torque will follow that of the required torque, and when the target air-fuel mixture amount, the target ignition timing and the target combustion speed are controlled for each cylinder such that the combustion pattern will become the target combustion pattern, whether or not the torque actually output from each cylinder is equal to the required torque. In the case where the torque output from a certain cylinder is not equal to but lower than the required torque, the target combustion pattern for the cylinder where the next combustion will occur (hereinafter referred to as "next cylinder") may be corrected such that the next cylinder will output torque higher than the required torque by the same amount as the torque output from the certain cylinder is lower than the required torque, so that the target air-fuel mixture amount, the target ignition timing and the target combustion speed for the next cylinder can accordingly be corrected. On the other hand, in the case where the torque output from a certain cylinder is not equal to but higher than the required torque, the target combustion pattern for the next cylinder may be corrected such that the next cylinder will output torque lower than the required torque by the same amount as the torque output from the certain cylinder is higher than the required torque, so that the target air-fuel mixture amount, the target ignition timing and the target combustion speed for the next cylinder can accordingly be corrected. In this way, it is possible to approximate the locus of the torque to be actually output to that of the required torque as closely as possible.

In the case where the target combustion pattern for the next cylinder is corrected such that the next cylinder will output torque higher, or lower, than the required torque by the same amount as the torque output from a certain cylinder is lower, or higher, than the required torque, so that the target air-fuel mixture amount, the target ignition timing and the target combustion speed for the next cylinder can accordingly be corrected, when the amount of variation in output torque is more than a predetermined value (when so-called torque shock occurs), the target air-fuel mixture amount, the target ignition timing and the target combustion speed for the next cylinder may be corrected such that the amount of variation in output torque will be less than the predetermined value.

As described above, the torque output from each cylinder can be controlled by controlling the amount of the air-fuel mixture in the combustion chamber 5, that is, the intake air amount and the fuel injection amount, the ignition timing, etc. The intake air amount can be controlled by controlling the degree of opening of the throttle valve 18, or by controlling the lift characteristics of the intake valve 6. The ignition timing can be controlled by controlling the firing timing. (In the case where the internal combustion engine is a compression auto-ignition type, so-called diesel internal combustion engine, the torque output from each cylinder can be controlled by controlling the fuel injection amount or the ignition timing, rather than the intake air amount. The ignition timing can be controlled by controlling the timing at which fuel is injected from the fuel injection valve into the cylinder.)

A comparison is made between an attempt to adjust the output torque to the required torque by changing the degree of opening of the throttle valve 18 to change the intake air amount, an attempt to adjust the output torque to the required torque by changing the lift characteristics of the intake valve 6 to change the intake air amount, and an attempt to adjust the output torque to the required torque by changing the ignition timing, that is, the firing timing. Defining the term "sensitivity" as the maximum level to which the output torque can be changed, the output torque exhibits the highest sensitivity to the attempt by changing the degree of opening of the throttle valve 18, the second highest to the attempt by changing the lift characteristics of the intake valve 6, and the lowest to the attempt by changing the firing timing. On the other hand, defining the term "response" as the duration since an attempt to change the output torque has been started until the torque is actually changed, the output torque exhibits the highest response to the attempt by changing the firing timing, the second highest to the attempt by changing the lift characteristics of the intake valve 6, and the lowest to the attempt by changing the degree of opening of the throttle valve 18.

Therefore, in an attempt to adjust the locus of the output torque to that of the required torque which has been changed, changing the degree of opening of the throttle valve 18 may not enable the output torque to follow fast changes in the required torque, for example. Also, changing the firing timing may not enable the output torque to follow large changes in the required torque, for example.

Thus, in the first embodiment described above, considering the sensitivity and the response of the output torque to the attempt by changing the degree of opening of the throttle valve 18, the attempt by changing the lift characteristics of the intake valve 6, and the attempt by changing the firing timing, such a target combustion pattern may be selected as to approximate the locus of the output torque to that of the required torque as closely as possible. That is, in the first embodiment described above, of a plurality of combustion patterns that can adjust the output torque to the required torque while not considering such sensitivity or response of the output torque, the combustion pattern that can approximate the output torque most closely to the required torque while considering such sensitivity and response of the output torque may be selected as the target combustion pattern.

In the first embodiment described above, the amount of control to be achieved by each control means, that is, the throttle valve 18, the variable intake valve operating mechanism and the spark plug 10, may be determined according to the torque response and the torque sensitivity selected according to the operating conditions of the internal combustion engine when the torque required of the internal combustion engine is changed. In a specific example of such a case, a higher torque response is selected when the operating conditions of the internal combustion engine suggest that priority should be given to reducing the emission of exhaust gas from the combustion chamber 5. In another example, a higher torque sensitivity is selected when the operating conditions of the internal combustion engine suggest that the amount of displacement of the accelerator pedal 40 or the amount of change therein per unit time is more than a predetermined value. In still another example, a higher torque sensitivity is selected when the operating conditions of the internal combustion engine suggest that the required torque is less than a predetermined value.

A description will now be made of a second embodiment of the present invention. In the second embodiment, on the assumption that the output torque is controlled by controlling the ignition timing, the combustion speed and the air-fuel mixture amount as in the first embodiment described above, the following control is performed. It has been found that the combustion efficiency can be maintained high by controlling the ignition timing (or, firing timing) such that the combustion ratio at a specific crank angle after compression top dead center will become a specific value. Specifically, it has been experimentally found that the combustion efficiency can be maintained highest by controlling the ignition timing (or, firing timing) such that the combustion ratio at a crank angle of 8° after compression top dead center (hereinafter referred to as "8° combustion ratio") will become 50% (or such that the combustion ratio at a crank angle of 10° after compression top dead center will become 53%) (see Japanese Patent Application Publication No. JP-A-2006-144645). Thus, in the second embodiment, the ignition timing (or, firing timing) is controlled such that the 8° combustion ratio will become 50%.

In addition, the present inventors have found that the amount of HC discharged from the combustion chamber 5 can be maintained small and the output torque can be increased by controlling the combustion speed such that the amount of variation in combustion ratio through a specific crank angle range will become a specific value. Specifically, it has been found that the amount of HC discharged from the combustion chamber 5 can be maintained small and the output torque can be increased by controlling die combustion speed such that the amount of variation in combustion ratio from compression top dead center (that is, a crank angle of 0°) to a crank angle of 15° after compression top dead center (hereinafter referred to as "15° combustion ratio variation amount") will become 68%.

Figure 6:
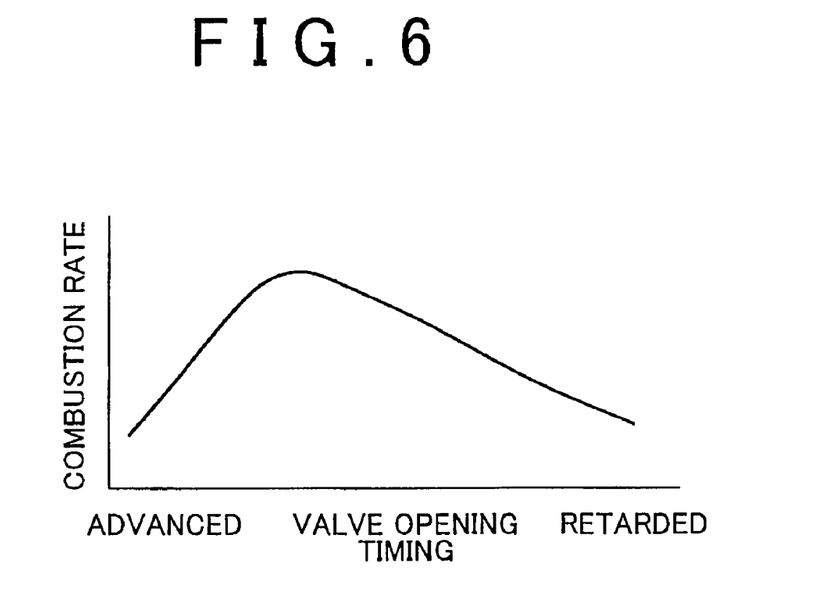
FIG. 6 shows the relation between the valve opening timing of an intake valve and the combustion rate.
Figure 7:
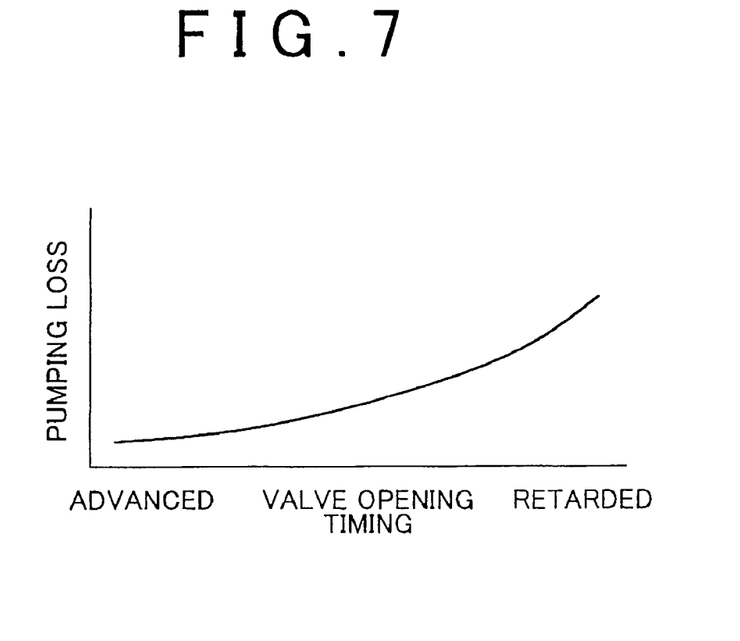
FIG. 7 shows the relation between the valve opening timing of the intake valve and pumping loss in an intake stroke.

As described above, as the valve opening timing of the intake valve 6 is advanced, overlap between the period for which the exhaust valve 8 is open and the period for which the intake valve 6 is open, or so-called valve overlap, is increased, which increases the amount of exhaust gas contained in the air-fuel mixture in the combustion chamber 5 and thus decreases the combustion speed. As the valve opening timing of the intake valve 6 is advanced, the combustion rate (which is the ratio of fuel burned in an expansion stroke to the fuel in the air-fuel mixture in the combustion chamber 5) gradually increases and reaches its peak at a specific valve opening timing, as shown in FIG. 6, because fuel is more combustible at a lower combustion speed. As the valve opening timing of the intake valve 6 is further advanced, the combustion rate gradually decreases, because the increased amount of exhaust gas in the air-fuel mixture in the combustion chamber 5 makes the combustion of fuel unstable. When the combustion rate is at its peak, the proportion of fuel in the air-fuel mixture in the combustion chamber 5 to be burned is largest, thus making the amount of fuel discharged from the combustion chamber 5 (HC) smallest. Meanwhile, as the valve opening timing of the intake valve 6 is advanced to increase so-called valve overlap, the pumping loss in an intake stroke gradually decreases, as shown in FIG. 7. It has been found when the 15° combustion ratio variation amount is controlled to about 68% (depending on the model of the engine) that the combustion rate is closest to the peak (or, the amount of HC discharged from the combustion chamber 5 is small) and the pumping loss in an intake stroke is smallest (or, the output torque is large).

Thus, in the second embodiment, the ignition timing, that is, firing timing, is controlled such that the 8° combustion ratio will become 50% as described above, and at the same time, the combustion speed, that is, the valve opening timing of the intake valve 6, is controlled such that the 15° combustion ratio variation amount will become 68%. In this way, the amount of HC discharged from the combustion chamber 5 can be maintained small as well as the output torque can be increased.

In the second embodiment, the air-fuel mixture amount (that is, the intake air amount and the fuel injection amount) is controlled based on the peak torque value as a target, as in the first embodiment.

When the engine operating conditions suggest that the load required of the internal combustion engine is too heavy, an attempt to control the ignition timing (or, firing timing) such that the 8° combustion ratio will become 50% may result in the occurrence of knocking. To avoid this, it may not be possible to control the ignition timing such that the 8° combustion ratio will become 50%. Thus, in the second embodiment, when the engine operating conditions suggest that the load required of the internal combustion engine is heavier than a predetermined value (that is, when it is not possible to control the ignition timing such that the 8° combustion ratio will become 50%), a value that is in a range where knocking does not occur and that is as close to 50% as possible may be set as the target 8° combustion ratio, and the ignition timing may be controlled such that the 8° combustion ratio will become the target 8° combustion ratio.

Figure 8:
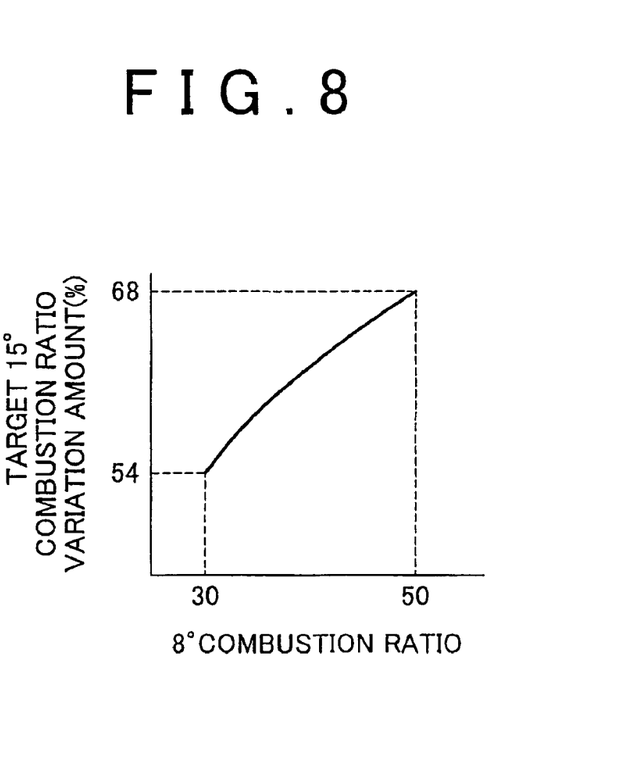
FIG. 8 shows the relation between the 8° combustion ratio and the target 15° combustion ratio change amount.

In this case, an attempt to control the combustion speed (that is, the valve opening timing of the intake valve 6) such that the 15° combustion ratio variation amount will become 68% may inevitably result in a failure. Thus, in the second embodiment, in the case where the operating conditions of the internal combustion suggest that the load required of the internal combustion engine is heavier than a predetermined value, a value that is in a range where knocking does not occur and that is as close to 50% as possible is set as the target 8° combustion ratio, and the ignition timing is controlled such that the 8° combustion ratio will become the target 8° combustion ratio, the target 15° combustion ratio variation amount may be set according to the set target 8° combustion ratio, for example utilizing the relation shown in FIG. 8, and the combustion speed (that is, the valve opening timing of the intake valve 6) may be controlled such that the 15° combustion ratio variation amount will become the target 15° combustion ratio variation amount. As shown in FIG. 8, the target 15° combustion ratio variation amount becomes smaller as the 8° combustion ratio becomes smaller.

In this case, the target 15° combustion ratio variation amount is set according to the 8° combustion ratio, that is, ignition timing. At this time, considering the emission of exhaust gas from the combustion chamber 5 and the pumping loss in an intake stroke (that is, output torque), an upper limit and a lower limit may be set for the target 15° combustion ratio variation amount (that is, the valve opening timing of the intake valve 6).

In a specific example of such a case, the target 15° combustion ratio variation amount is set to a value closer to the upper limit rather than to the lower limit when the operating conditions of the internal combustion engine suggest that priority should be given to increasing the output torque rather than to reducing the emission of exhaust gas from the combustion chamber 5. On the other hand, the target 15° combustion ratio variation amount is set to a value closer to the lower limit rather than to the upper limit when the operating conditions of the internal combustion engine suggest that priority should be given to reducing the emission of exhaust gas from the combustion chamber 5 rather than to increasing the output torque.

Figure 9:
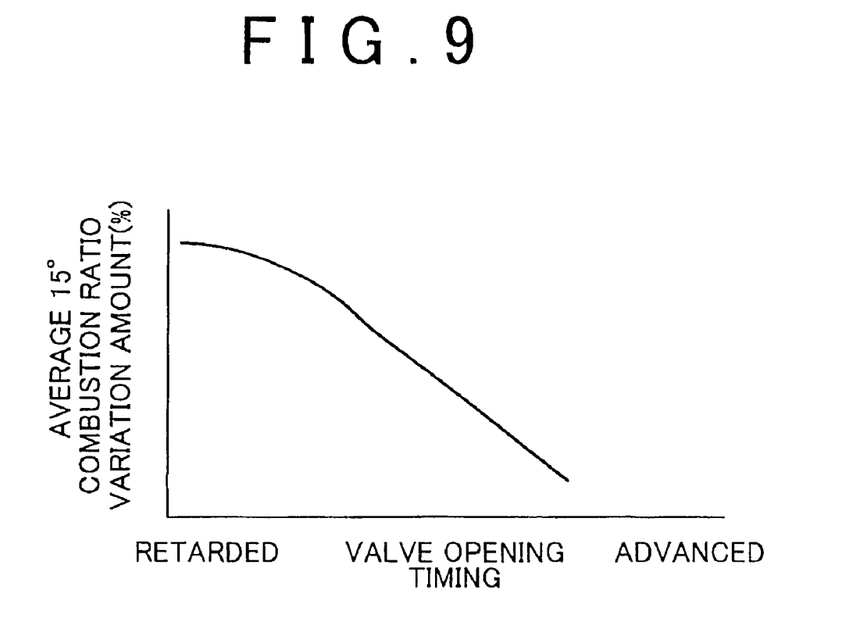
FIG. 9 shows the relation between the valve opening timing of the intake valve and the average 15° combustion ratio change amount.
Figure 10:
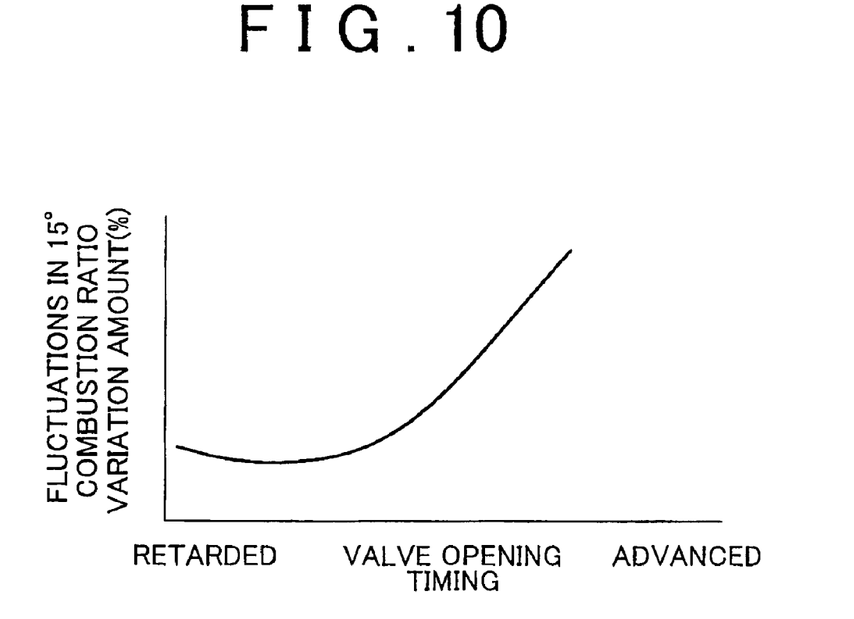
FIG. 10 shows the relation between the valve opening timing of the intake valve and the fluctuations in 15° combustion ratio change amount between combustions.

As described above, as the valve opening timing of the intake valve 6 is advanced to increase so-called valve overlap, the amount of exhaust gas in the air-fuel mixture in the combustion chamber 5 increases and the combustion speed decreases. Thus, as the valve opening timing of the intake valve 6 is advanced, the average of the 15° combustion ratio variation amounts in combustions gradually decreases, as shown in FIG. 9. Meanwhile, the increased amount of exhaust gas in the air-fuel mixture in the combustion chamber 5 makes the combustion unstable. Thus, as the valve opening timing of the intake valve 6 is advanced, the fluctuations in 15° combustion ratio variation amount between combustions become larger. That is, as the valve opening timing of the intake valve 6 is advanced to decrease the 15° combustion ratio variation amount, the fluctuations in 15° combustion ratio variation amount between combustions become larger.

Thus, in the second embodiment, the valve opening timing of the intake valve 6 may be controlled such that the 15° combustion ratio variation amount will become 68%, and at the same time, the difference in 15° combustion ratio variation amount between combustions may be monitored, so that: while the difference is less than a fixed value, the valve opening timing of the intake valve 6 will be advanced, or allowed to be advanced; and while the difference is more than the fixed value, the valve opening timing of the intake valve 6 will be retarded, prohibited from being advanced, or retarded and prohibited from being advanced.

Figure 11:
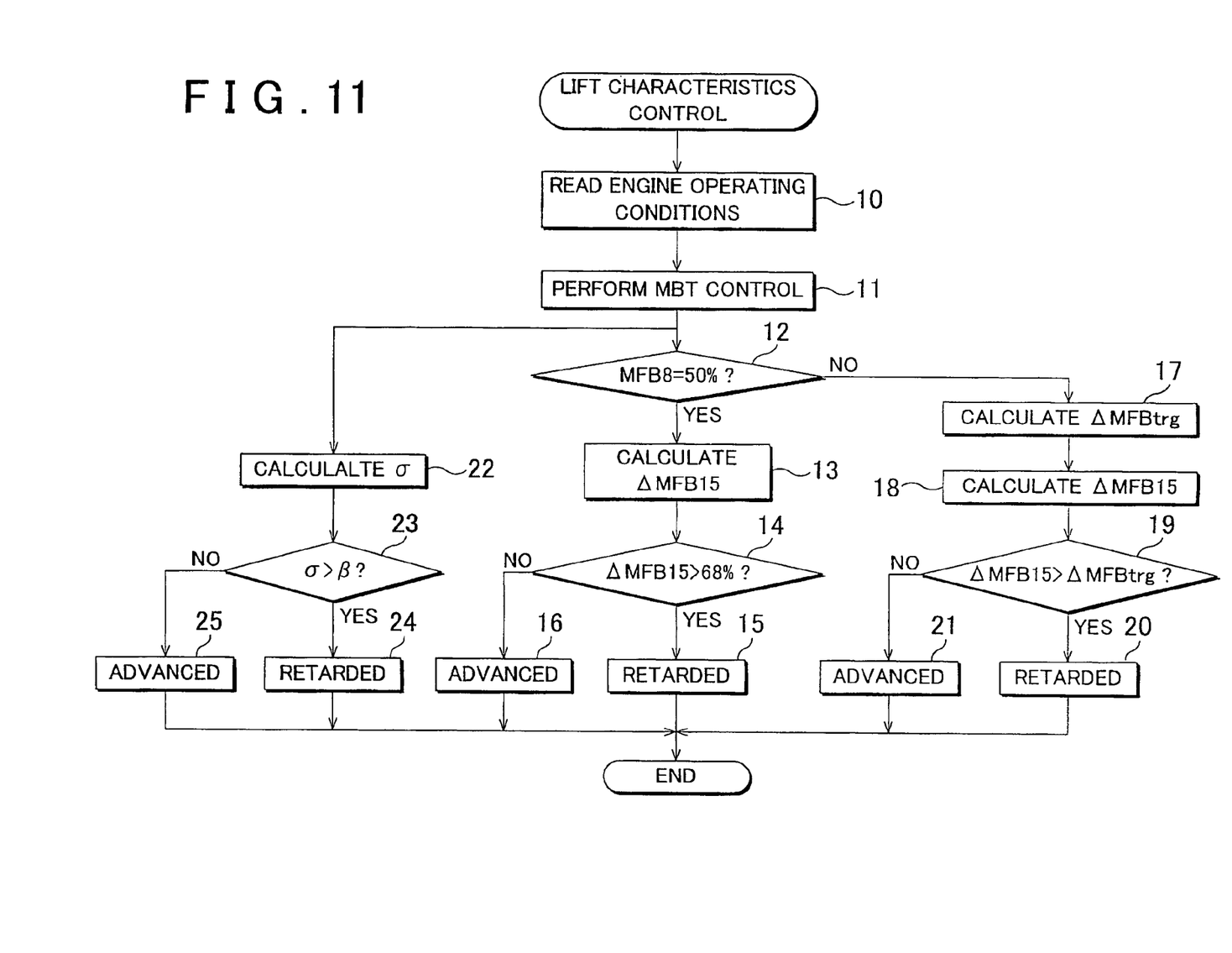
FIG. 11 is an exemplary flowchart for controlling an internal combustion engine according to a second embodiment of the present invention.

FIG. 11 is an exemplary flowchart for performing control in the second embodiment. In the flowchart of FIG. 11, first of all, the engine operating conditions are read in step 10. Then, in step 11, MBT control (Minimum Advance for Best Torque control) is performed in which the ignition timing (or, firing timing) is controlled such that the 8° combustion ratio will become 50%. Then, the routine proceeds to step 12 and step 22. In step 12, it is determined whether or not the 8° combustion ratio MFB is 50% (MFB8=50%). If it is determined that MFB8=50% holds, the routine proceeds to step 13. If it is determined that MFB8=50% does not hold, the routine proceeds to step 17.

In step 13, the 15° combustion ratio variation amount ΔMFB15 is calculated. Then, in step 14, it is determined whether or not the 15° combustion ratio variation amount ΔMFB15 calculated in step 13 is more than 68% (ΔMFB15>68%). If it is determined that ΔMFB 15 >68%, the routine proceeds to step 15, where the valve opening timing of the intake valve 6 is retarded to decrease the 15° combustion ratio variation amount. On the other hand, if it is determined that ΔMFB 15≦68%, the routine proceeds to step 16, where the valve opening timing of the intake valve 6 is advanced to increase the 15° combustion ratio variation amount.

Meanwhile, if it is determined in step 12 that MFB8=50% does not hold, the target 8° combustion ratio has been set to a value less than 50%. In step 17 that follows, the target 15° combustion ratio variation amount ΔMFBtrg is calculated based on the target 8° combustion ratio TMFB8 which has been set to a value less than 50%, for example utilizing the relation shown in FIG. 8. Then, in step 18, the 15° combustion ratio variation amount ΔMFB 15 is calculated. Then, in step 19, it is determined whether or not the 15° combustion ratio variation amount ΔMFB 15 calculated in step 18 is more than the target 15° combustion ratio variation amount ΔMFBtrg calculated in step 17 (ΔMFB15>ΔMFBtrg). If it is determined that ΔMFB15>ΔMFBtrg, the routine proceeds to step 20, where the valve opening timing of the intake valve 6 is retarded to decrease the 15° combustion ratio variation amount. On the other hand, if it is determined that ΔMFB15≦ΔMFBtrg, the routine proceeds to step 21, where the valve opening timing of the intake valve 6 is advanced to increase the 15° combustion ratio variation amount.

Meanwhile, in step 22, the difference σ in 15° combustion ratio variation amount between combustions is calculated. Then, in step 23, it is determined whether or not the difference σ is more than a fixed value β (σ>β). If it is determined that σ>β, the routine proceeds to step 24, where the valve opening timing of the intake valve 6 is retarded. On the other hand, if it is determined that σ≦β, the routine proceeds to step 25, where the valve opening timing of the intake valve 6 is advanced.

In the second embodiment described above, when the engine operating conditions suggest that the load required of the internal combustion engine is heavier than a predetermined value (that is, when it is not possible to control the ignition timing such that the 8° combustion ratio will become 50%), the target 15° combustion ratio variation amount is set based on the target 8° combustion ratio which has been set to a value that is in a range where knocking does not occur and that is as close to 50% as possible, utilizing the relation shown in FIG. 8, and the combustion speed (that is, the valve opening timing of the intake valve 6) is controlled such that the 15° combustion ratio variation amount will become the target 15° combustion ratio variation amount. In the second embodiment, however, the target 15° combustion ratio variation amount may be set based on the actual 8° combustion ratio used when the ignition timing (or, firing timing) is controlled such that the 8° combustion ratio will become the target 8° combustion ratio which has been set to a value that is in a range where knocking does not occur and that is as close to 50% as possible, utilizing the relation shown in FIG. 8, and the combustion speed may be controlled such that the 15° combustion ratio variation amount will become the target 15° combustion ratio variation amount. This improves the control response.

Also, in the second embodiment described above, the amount of variation in combustion ratio over a range from compression top dead center to a crank angle of 15° after compression top dead center is adopted as the 15° combustion ratio variation amount, irrespective of the target 8° combustion ratio, that is, the target ignition timing. In the second embodiment, however, the amount of variation in combustion ratio over a range on the advanced side relative to the range from compression top dead center to a crank angle of 15° after compression top dead center, for example a range from a crank angle of 5° before compression top dead center to a crank angle of 10° after compression top dead center, may be adopted as the 15° combustion ratio variation amount when the target 8° combustion ratio is less than a predetermined value (for example, 20%) and thus the target ignition timing is retarded. This improves the controllability.

As has been described above, according to the embodiments of the present invention, the firing timing, the valve opening timing of the intake valve (the amount of exhaust gas in the air-fuel mixture in the combustion chamber) and the air-fuel mixture amount are controlled using the combustion pattern in the combustion chamber itself, or the 8° combustion ratio (ignition timing), the 15° combustion ratio variation amount (combustion speed) and the torque peak value which are components thereof, as target values. Thus, such control of the firing timing, the valve opening timing of the intake valve and the air-fuel mixture amount can be performed without considering the influence of the fluctuations between engines, hence performing the step of preliminarily obtaining target values, or considering the influence of the changes over time of the internal combustion engine.

The invention claimed is:

1. A control system for an internal combustion engine, comprising:
   a detecting device that detects transition in a cumulative amount of heat generated in a combustion chamber based on a pressure in the combustion chamber in an expansion stroke;
   an exhaust gas controller that controls an amount of exhaust gas contained in an air fuel mixture in the combustion chamber such that an amount of change in the cumulative amount of heat generated in the combustion chamber through a predetermined crank angle range will become a predetermined value;
   an ignition timing controller that controls an ignition timing of fuel in the combustion chamber according to operating conditions of the internal combustion engine, wherein the predetermined value for the amount of change in the cumulative amount of heat generated in the combustion chamber through the predetermined crank angle range is set according to the ignition timing of fuel in the combustion chamber.

2. The control system according to claim 1, wherein the ignition timing of fuel in the combustion chamber is controlled such that the cumulative amount of heat generated in the combustion chamber will become a predetermined value at a predetermined crank angle.

3. The control system according to claim 1, wherein the predetermined value for the amount of change in the cumulative amount of heat generated in the combustion chamber through the predetermined crank angle range is set to be smaller, in a case where a combustion rate of fuel is highest when the cumulative amount of heat generated in the combustion chamber follows a locus on which the cumulative amount becomes a predetermined value at a predetermined crank angle, when the ignition timing of fuel in the combustion chamber is retarded compared to that at which the cumulative amount of heat generated in the combustion chamber can follow the locus on which the cumulative amount becomes the predetermined value at the predetermined crank angle.

4. A control system for an internal combustion engine, comprising:
   a detecting device that detects transition in a cumulative amount of heat generated in a combustion chamber based on a pressure in the combustion chamber in an expansion stroke; and
   an exhaust gas controller that controls an amount of exhaust gas contained in an air-fuel mixture in the combustion chamber such that an amount of change in the cumulative amount of heat generated in the combustion chamber through a predetermined crank angle range will become a predetermined value;
   wherein the predetermined crank angle range is set according to the ignition timing of fuel in the combustion chamber.

5. A control method for an internal combustion engine, comprising:
   detecting transition of a cumulative amount of heat generated in a combustion chamber based on a pressure in the combustion chamber in an expansion stroke;
   controlling an amount of exhaust gas contained in an air-fuel mixture in the combustion chamber such that an amount of change in the cumulative amount of heat generated in the combustion chamber through a predetermined crank angle range will become a predetermined value;
   controlling an ignition timing of fuel in the combustion chamber according to operating conditions of the internal combustion engine; and
   setting the predetermined value for the amount of change in the cumulative amount of heat generated in the combustion chamber through the predetermined crank angle range according to the ignition timing of fuel in the combustion chamber.

* * * * *